United States Patent [19]
Tucker

[11] Patent Number: 5,664,179
[45] Date of Patent: Sep. 2, 1997

[54] MODIFIED SKIP LIST DATABASE STRUCTURE AND METHOD FOR ACCESS

[75] Inventor: Roger Tucker, Colorado Springs, Colo.

[73] Assignee: MCI Corporation, Washington, D.C.

[21] Appl. No.: 495,070

[22] Filed: Jun. 27, 1995

[51] Int. Cl.$^6$ .................................................. G06F 17/30
[52] U.S. Cl. ........................................ 395/611; 395/613
[58] Field of Search ..................................... 395/611, 613

[56] References Cited

U.S. PATENT DOCUMENTS

| | | | |
|---|---|---|---|
| 4,507,752 | 3/1985 | McKenna et al. | 395/603 |
| 5,274,805 | 12/1993 | Ferguson et al. | 395/607 |
| 5,276,868 | 1/1994 | Poole | 395/612 |

OTHER PUBLICATIONS

T. Papadakis, "Skip Lists and Probabilistic Analysis of Algorithms", A thesis for University Of Waterloo, Ontario, Canada, 1993, pp. 1–146.

W. Pugh, "A Skip List Cookbook", Institute For Advanced Computer Studies, University Of Maryland, Jun. 1990, pp. 1–14.

Pugh, W., "Skip Lists: A Probabilistic Alternative to Balanced Trees", Communications of ACM, Jun. 1990, pp. 668–676.

*Primary Examiner*—John C. Loomis

[57] ABSTRACT

A database management system and method for operation allow both key compression and quick indexed retrieval of nodes. The system includes a processor, memory and a modified skip list data structure with compressed search keys. The prior art skip list structure is modified so that each node has only one other node pointing to it. This allows search keys to be compressed based on the key of the previous node. Key compression allows the data structure to use less memory than is otherwise possible.

16 Claims, 8 Drawing Sheets

MODIFIED SKIP LIST DATABASE STRUCTURE AND METHOD FOR ACCESS

BACKGROUND OF THE INVENTION

1. Field Of The Invention

The invention relates to systems and methods for in-memory database access, and more particularly to systems and methods for insertion, deletion and access in a database organized as a skip list using compressed search keys.

2. Background Information

Telecommunications networks use databases to store very large amounts of information. One such application is the translation of 800 telephone numbers to geographic termination numbers. Another application is validation of credit card calls. In both applications, there are millions of records which must be searched. The search must be performed while a customer is waiting for a call to be completed, so it must be completed within a few seconds. Large numbers of search requests may arrive simultaneously, but again, each search cannot take more than a few seconds. Current art disk-based database systems do not have the throughput to meet these requirements. Therefore, current art systems are generally memory based.

Since a database may contain millions of records, a memory-based database system must contain a large amount of memory. Systems having one gigabyte of main memory are not unusual. Nevertheless, increased calling, internationalization of credit cards and increasing users of 800 numbers have increased the size of such databases to the point that even one gigabyte may not be sufficient. Systems with more memory are possible, but their cost is very high.

A better solution to the problem is to compress the database. Compression of the data fields is well known in the art, but additional memory usage improvement can be had by compressing the key values as well. One way to compress key values is to store the nodes in sorted order by key value with the search key for each node based on the difference between the key value for that node and the key value for the previous node. The problem is to create an in memory data structure that allows both key compression and quick indexed retrieval.

3. Other Publications

W. Pugh, "Skip Lists: A Probabilistic Alternative to Balanced Trees", *Communications of the ACM*, 33(6)668–676 (1990).

W. Pugh, *A Skip List Cookbook*, University of Maryland (1990).

SUMMARY OF THE INVENTION

An object of the invention is an in memory data structure with compressed search keys which allows quick indexed retrieval.

Another object is a system and method for insertion, deletion and access to data stored in a skip list having compressed keys These and other objects and advantages are accomplished by a modified skip list data structure. A skip list data structure in accordance with the present invention is a linked list in which some of the nodes have more than one pointer. The number of pointers contained in a node is determined when the node is created and is usually not changed. Every node has at least one pointer which may point to another node. Other nodes have additional pointers which point to nodes further down the list. When the list is searched by following the pointers, the additional pointers allow the search to skip over many of the nodes. This improves searching performance.

Each node contains an element and at least one pointer. The element contains a search key which is a compressed representation of a key value which is used to identify the desired node for a search. The element may also contain data. The presence of compressed search keys allows the present invention to use significantly less memory than the current art to store a given amount of data. The search key for a particular node is generated based on the difference between the key value of that node and the key value of the node which points to that node. The prior art skip list structure allowed a node to be pointed to by multiple other nodes, and did not have compressed search keys. The search key compression method of the present invention could not be used with prior art skip lists because a node could be pointed to by multiple other nodes. Because of the search key compression of the present invention, the present invention skip list structure has been modified to ensure that each node is pointed to by only one other node.

A search of the data structure is begun using the highest level pointers, that is the pointers which skip over the most nodes. Since the list is in sorted order, it is simple to detect when the search has gone too far. In this case, the search goes back to the previous node and drops down to a lower level pointer in order to search some of the nodes which were previously skipped over. The search continues in this way until the desired node is found or until the node cannot be found and the search is at the lowest level.

BRIEF DESCRIPTION OF THE DRAWINGS

FIG. 5b is a flow diagram of a subprocess of step 504 of FIG. 5a.

DETAILED DESCRIPTION OF THE INVENTION

Figure 1:
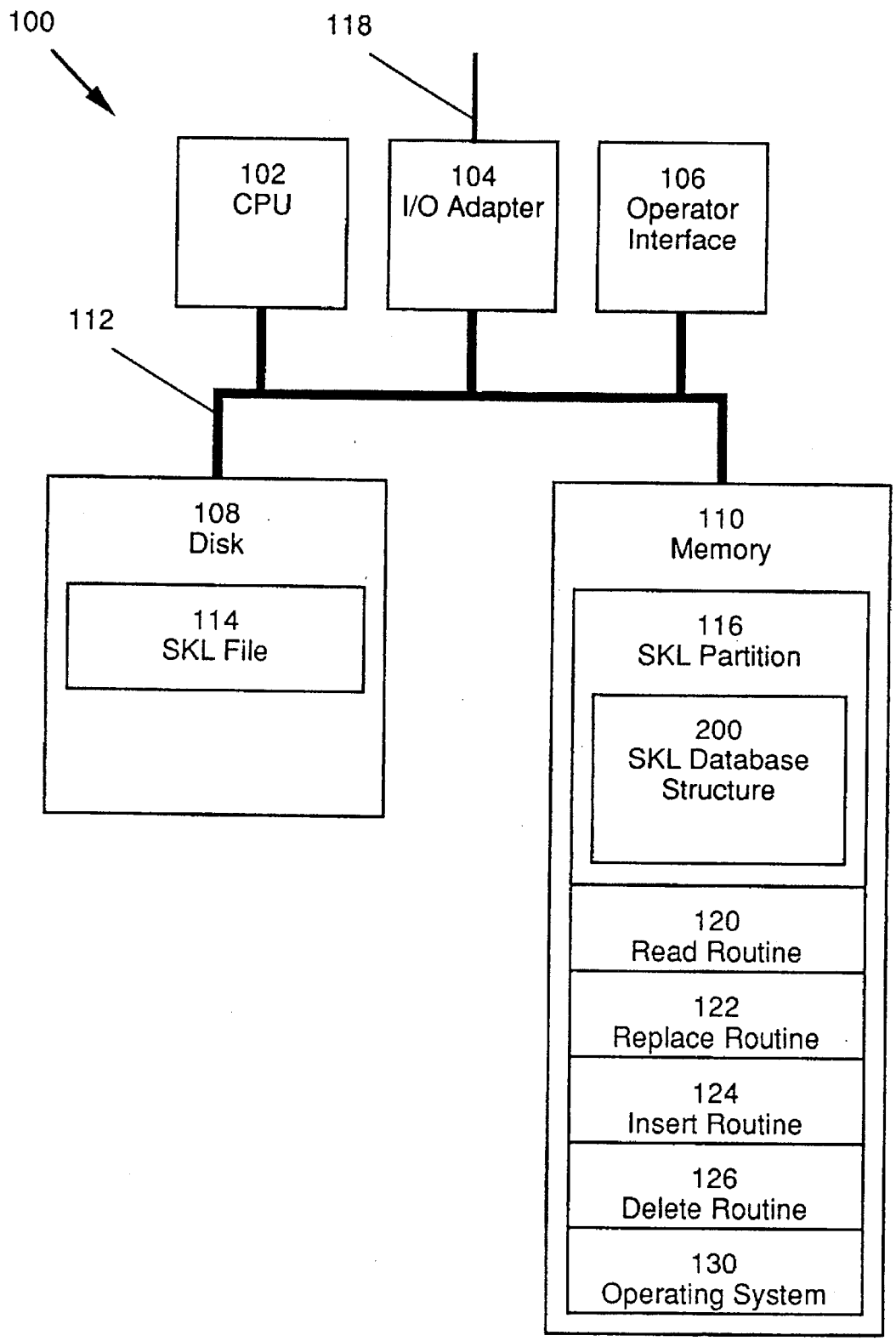
FIG. 1 is a block diagram of a database system in accordance with the invention.

FIG. 1 is a block diagram of a database system 100 with a skip list (SKL) database. The system includes CPU 102, I/O adapter 104, operator interface 106, disk 108 and memory 110 which are all connected by bus 112. I/O adapter 104 is connected to communications network 118. Memory 110 includes SKL partition 116 which contains SKL database structure 200 and read routine 120, replace routine 122, insert routine 124 and delete routine 126 for use with SKL database structure 200. Memory 110 also includes operating system 130.

Figure 2A:
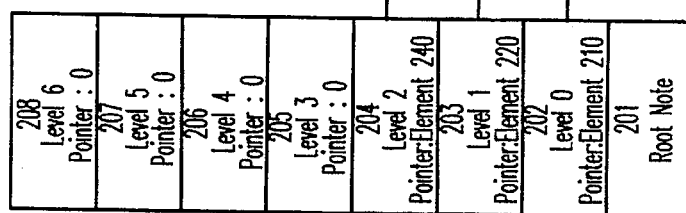
FIG. 2a is a block diagram of an embodiment of a modified SKL database structure 200 in the database system of FIG. 1.

FIG. 2a is a block diagram of an embodiment of a modified SKL database structure 200 in the database system of FIG. 1. Root node 201 is shown as including seven pointers: level 0 pointer 202 which points to node 210, level 1 pointer 203 which points to node 220, level 2 pointer 204 which points to node 240, level 3 pointer 205 which is 0, level 4 pointer 206 which is 20, level 5 pointer 207 which is 0 and level 6 pointer 208 which is 0. A pointer of 0 indicates that the pointer does not point to another node. Nine nodes 210, 220, 230, 240, 250, 260, 270, 280 and 290 are shown. Each node contains an element 219, 229, 239, 249, 259, 269, 279, 289 and 299 respectively. Each element contains a search key 211, 221, 231, 241, 251, 261, 271, 281 and 291 respectively which represent key values AAA, AAB, AAD, AAE, ABA, ABB, ABC, ACA and ACB respectively. Each element also contains an optional data field 213, 224, 233, 245, 254, 263, 275, 283 and 293 respectively. Each key value is compressed to form the search key based on the key value of the previous node in the list. The key values are shown to aid in understanding the figure, but are not part of the data structure.

The search key of a particular node includes the number of initial characters of the key value for that node which are the same as in the key value for the previous node, plus the remaining characters which are different. For example, Node 240 is subsequent to root node 201, so node 240 has search key 241 which is AAE, the same as the key value. Mode 240 is previous to node 270, which has search key 271 equal to 1BC. The initial character of both key values is A, so search key 271 begins with 1. The remaining characters of the key value for node 270 are BC, so search key 271 contains 1 plus BC. The search key of the first node in any pointer chain is the same as the key value for that node. For example, node 210 has search key 211 which is AAA. This is the same as the key value for node 210.

Each node also contains a number of pointers which point to other nodes. A node which points to another node is termed previous to the node pointed to. A node is termed subsequent to a node which points to it. The number of pointers contained by a node depends on what is termed the level of the node. The level of a particular node is assigned when the node is created. A node contains a number of pointers equal to its level plus 1. Pointers are also termed to have levels. A node of a given level contains pointers from level 0 up to the level of the node. Thus, Level 0 nodes contain one pointer, a level 0 pointer, level 1 nodes contain 2 pointers, a level 0 and a level 1 pointer, level 2 nodes contain 3 pointers, a level 0, a level 1 and a level 2 pointer, and so on.

A pointer of a given level points to the subsequent node of the same level. Thus, a level 0 pointer points to the next subsequent level 0 node, a level 1 pointer points to the next subsequent level 1 node, and so on. When a pointer of a given level is followed by a node of a greater level than the pointer, there are no nodes to which the pointer can point, so the pointer is set to 0. This means that there are no nodes of the same level as the pointer subsequent to the node. Thus, a pointer equal to 0 indicates that no nodes are subsequent to that node. This results in each node being pointed to by only one other node.

Five level 0 nodes are shown. Node 210 has pointer 212 which is 0, node 230 has pointer 232 which is 0, node 260 has pointer 262 which is 0, node 280 has pointer 282 which points to level 0 node 290 and node 290 has pointer 292 which is 0. Two level 1 nodes are shown. Node 220 has level 1 pointer 223 which is 0 and level 0 pointer 222 which points to level 0 node 230. Node 250 has level 1 pointer 253 which is 0 and level 0 pointer 252 which points to level 0 node 260. Two level 2 nodes are shown. Node 240 has level 2 pointer 244 which points to level 2 node 270, level 1 pointer 243 which points to level 1 node 250 and level 0 pointer 242 which is 0. Node 270 has level 2 pointer 274 which is 0, level 1 pointer 273 which is 0 and level 0 pointer 272 which points to level 1 node 280. Root node 201 is a level 6 node, but never contains any data.

Figure 2B:
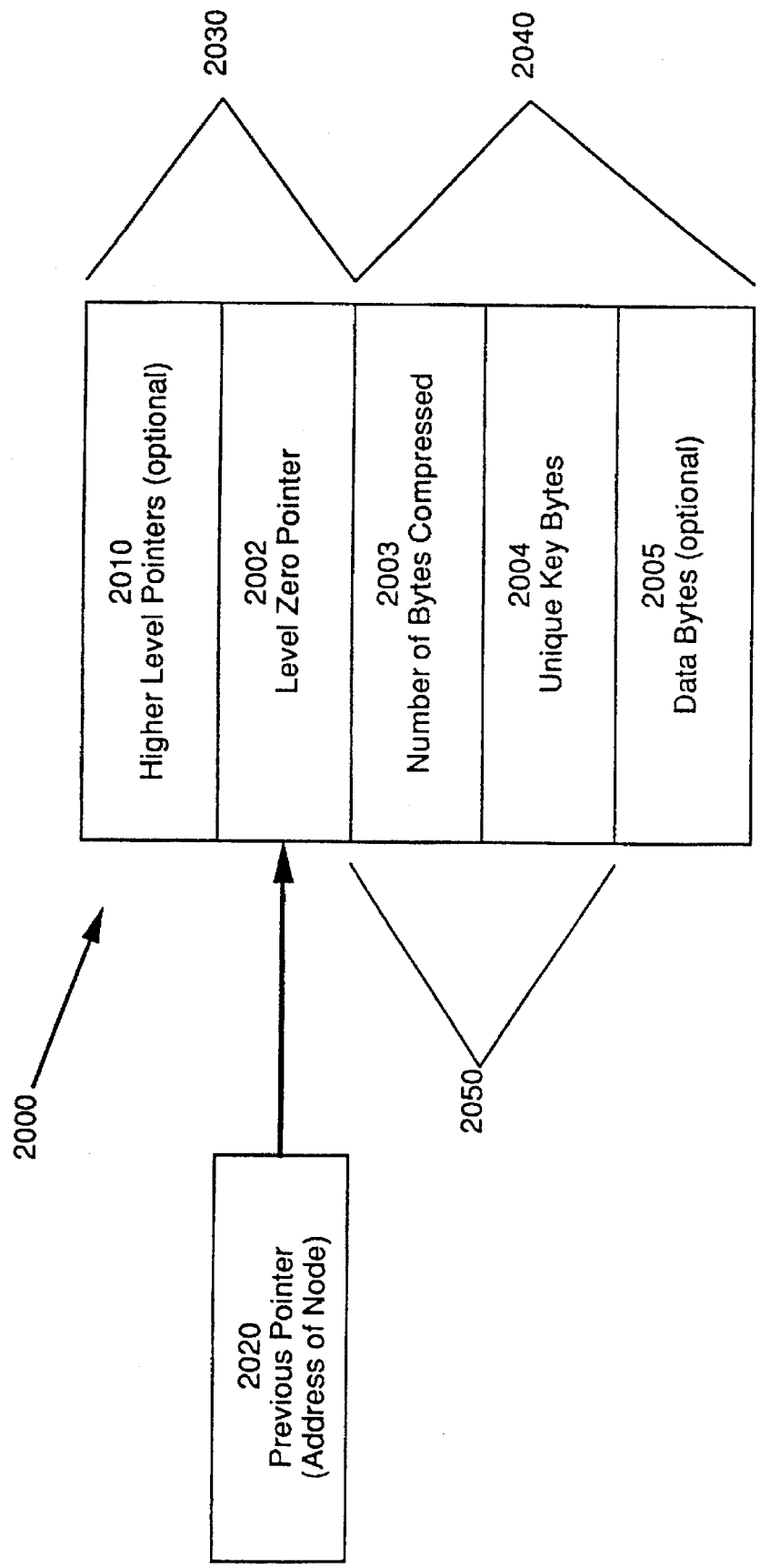
FIG. 2b is a block diagram of an embodiment of a node of a modified SKL database structure in the database system of FIG. 1.

FIG. 2b is a block diagram of an embodiment of a node 2000 of a modified SKL database structure in the database system of FIG. 1. Node 2000 includes element 2040 and pointers 2030. Element 2040 includes search key 2050 and optional data bytes 2005. Search key 2050 includes a one byte indicator of the number of compressed bytes. The bytes are removed from search key 2050 of this node because they match the search key of the previous node. Search key 2050 also includes a variable number of unique key bytes 2004. These are the bytes that are different from the search key of the previous node. Pointers 2030 always includes level zero pointer 2002. Pointers 2010 may also include higher level pointers 2010. Each pointer contains either the address of the level zero pointer of the subsequent node or zero. A pointer value of zero indicates that the node has no subsequent node of the level of the pointer. The address of a node is given by the address of it's level zero pointer. Level subscripts are negative offsets from level zero.

Figure 3:
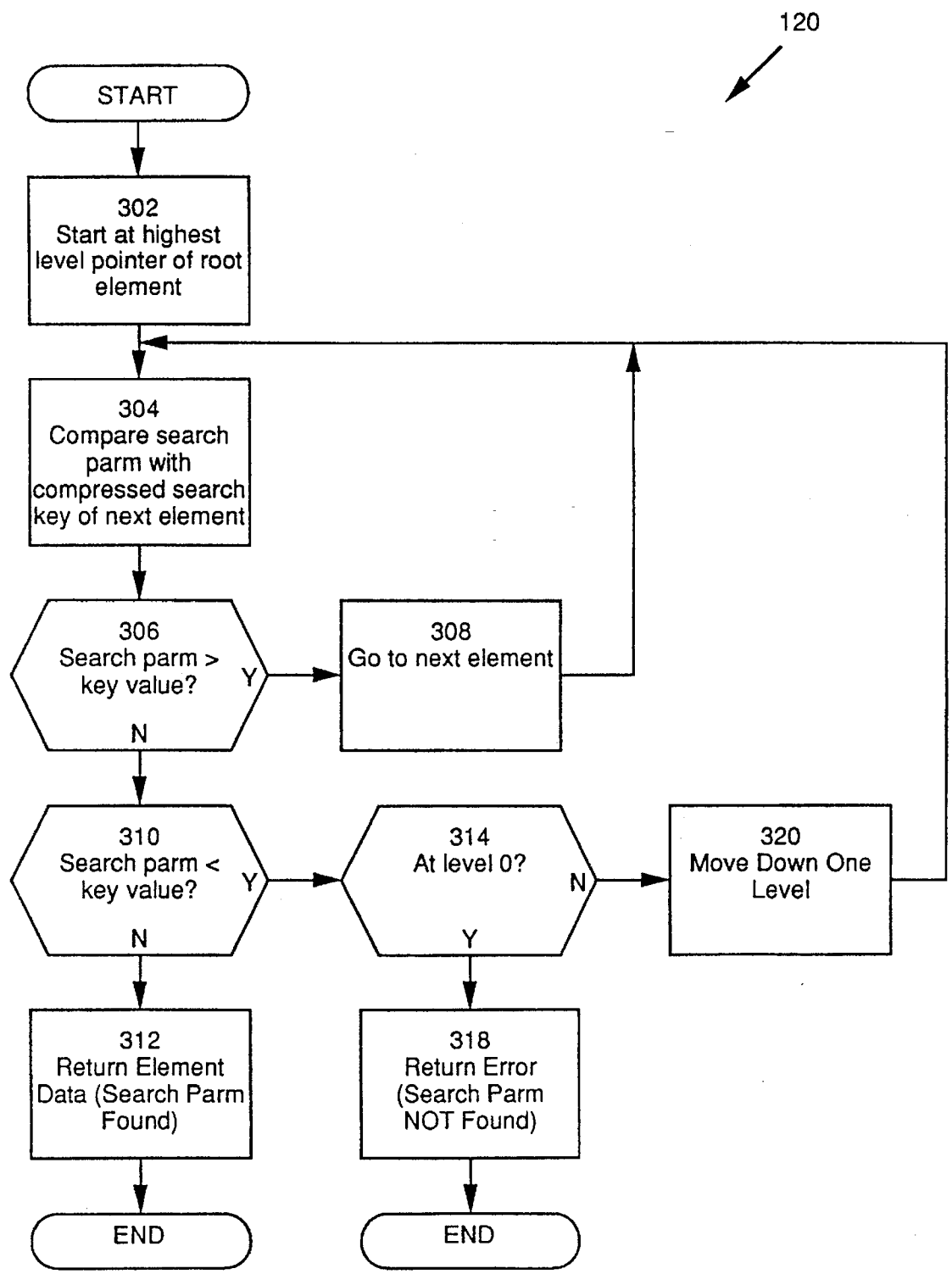
FIG. 3 is a flow diagram of read routine 120 for use with the database structure of FIG. 2.

FIG. 3a is a flow diagram of an embodiment of read routine 120. The input parameters of routine 120 include the desired key for which the routine is to search, termed the input search parameter. Routine 120 starts in step 302, in which the root node is the current node and the highest level pointer of the root node which is in use is used to point to the next node. In step 304, the input search parameter is compared with the compressed search key of the next node. In step 306, if the input search parameter is greater then the key value, routine 120 goes to step 308, in which the next node is made the current node. Routine 120 then loops to step 304. If the input search parameter is not greater than the key value, routine 120 goes to step 310. In step 310, if the input search parameter is less than the key value, routine 120 goes to step 314. If the input search parameter is not less than the key value, the desired node has been found and routine 120 goes to step 312, in which the data field of the node is returned. Routine 120 then ends. In step 314, if routine 120 is at level 0, the desired node is not in the skip list and routine 120 goes to step 318, in which an input search parameter not found error is returned. Routine 120 then ends. If routine 120 is not at level 0, it goes to step 320, in which routine 120 moves down one level and loops to step 304.

Further description of the searching of a modified skip list data structure of the present invention may be found in the following exemplary Read Routine Program Listing A:

| PROGRAM LISTING A - READ ROUTINE | |
|---|---|
| read(skl, sparm) | /* skl = pointer to list, sparm = value to search for */ |
| { | |
| p = skl—>header | /* pointer to node */ |
| match = 0; | /* number of characters which match = none */ |
| i = 1; | /* match flag = no */ |
| k = skl—>level; | /* current level = highest defined level of list */ |
| do | /* repeat steps . . . */ |
| { | |
| nextmatch = match; | /* save number of characters matched so far */ |

-continued

PROGRAM LISTING A - READ ROUTINE

```
while (p—>forward[k] && (i =       /* compare search parameter
  cmp(p—>forward[k], sparm,          with search key of current
  &nextmatch)) < 0)                  node, set i = result of
                                     compare, while pointer of
                                     current level of current
                                     node is not zero and key
                                     doesn't match key of next
                                     node, repeat ... */
{
   match = nextmatch;              /* update number of
                                     characters now matched */
   p = p—>foward[k];               /* go to next node of same
                                     level */
}
} while (i && ++k <= 0);           /* while no match and not at
                                     level zero, move down a
                                     level and loop */
if (i) return failure              /* if no match and at level
                                     zero, return failure */
return p—>forward[k].value;        /* otherwise return data */
}
```

Further description of the comparison of an input search parameter with a search key of the present invention may be found in the following exemplary Compare Routine Program Listing B:

PROGRAM LISTING B - COMPARE ROUTINE

```
static int cmp(SKL_HEADER *hdrp, SKL_NODE *p, unsigned char
*keyp, int key_size, int *matchp)
{
   int key_size2 = hdrp—>key_size;
   int compressed = 0;
   int i;
   int matched = *matchp;
   int loop;
   unsigned char *tmp = (unsigned char *)p + sizeof(SKL_NODE);
   compressed = *(unsigned char *)tmp;
   if (compressed > matched) return -1;
   tmp += sizeof(unsigned char);
   matched = compresssed;
   keyp += compressed;
   /* Perform compare - remember the number of characters
matched */
   i = 0;
   loop = MIN(key_size, key_size2 - compressed);
      while (loop && *tmp == *keyp)
   {
      tmp++;
      keyp++;
      matched++;
      loop—;
   }
   if (loop) i = (int)*tmp - (int)*keyp;
   if (!i) i = key_size2 - key_size;
   *matchp = matched;
   return i;
}
```

The compare routine returns a number less than zero if the node is less than the key, zero if the node is equal to the key, or a number greater than zero if the node is greater than the key. It also returns the number of characters successfully matched. If the node to compare with is compressed more than what was successfully matched with the previous node than the current node must also be less.

Figure 4:
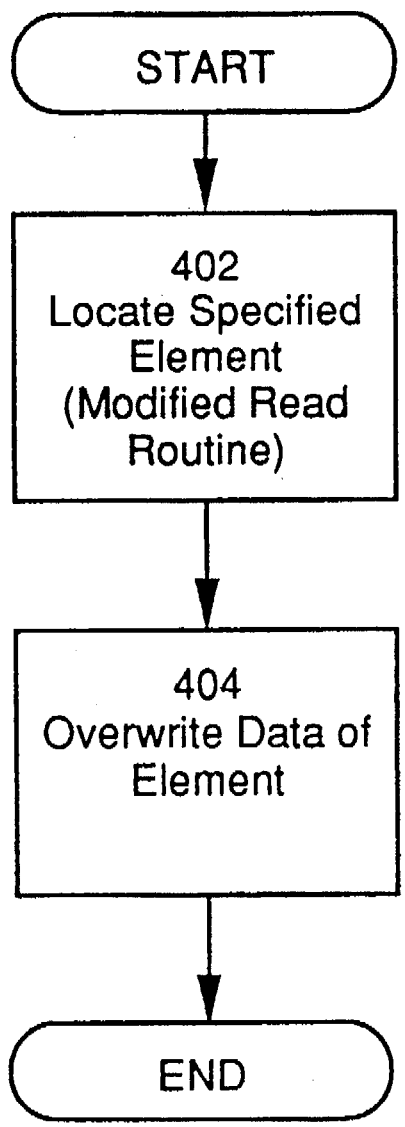
FIG. 4 is a flow diagram of replace routine 122 for use with the database structure of FIG. 2.

FIG. 4 is a flow diagram of replace routine 122. In Step 402, routine 122 locates the node having a search key equal to the input search parameter using a process similar to that of read routine 120, except that step 402 returns the location of the node data and routine 120 returns the node data itself.

In step 404, routine 122 uses the location of the node data returned in step 402 and writes new data over the old data. Routine 122 then ends.

Figure 5A:
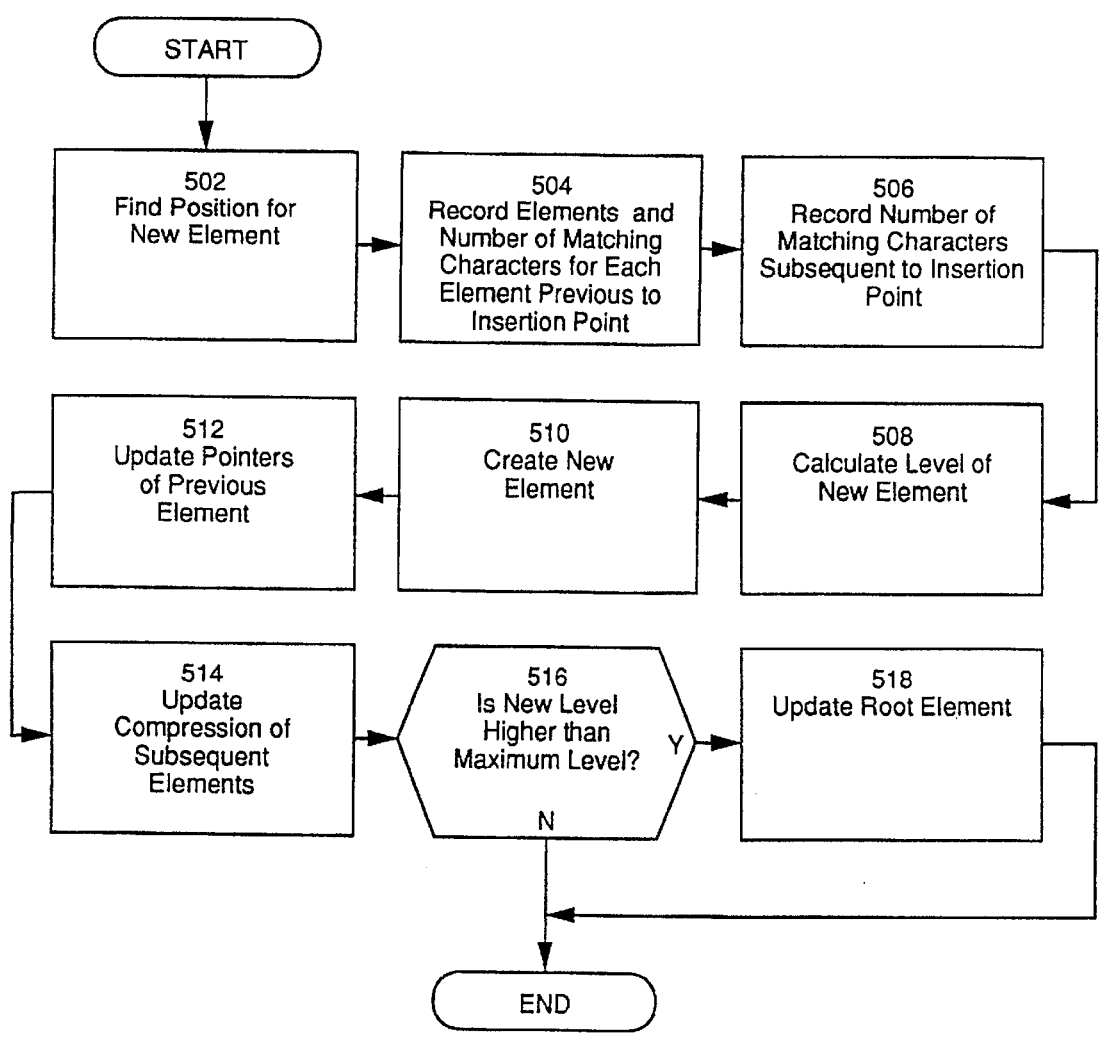
FIG. 5a is a flow diagram of add routine 124 for use with the database structure of FIG. 2.

FIG. 5a is a flow diagram of an insert routine 124. In step 502, routine 124 locates the position for the new node by comparing the key value of the node being inserted with the key values of the existing nodes. In step 504, the identity of the node previous to the insertion point for each level in the data structure is recorded. In addition, the number of matching characters for each such node is also recorded. In step 506, the number of matching characters for the node of each level subsequent to the insertion point is recorded. In step 508, the level of the new node is calculated. In step 510, the new node is created. The search key of the new node is created by compressing and storing the number of characters of the key value removed based on the level of the new node. The pointers of the new node are created by setting the pointers of the new node to point to the subsequent nodes by copying the pointer values from the previous nodes of the same or lesser height. In step 512, the pointers of the previous nodes are adjusted to point to the new node. In step 514, the search keys of nodes subsequent to the new node are recompressed as necessary. In step 516, the level of the new node is compared to the maximum level in use in the data structure. If the new level is higher than the maximum level, routine 124 goes to step 518, in which the root node of the data structure is updated to include the new level. Routine 124 then ends. If the new level is not higher than the maximum 25 level, routine 124 ends.

Further description of the insertion of a new node in a modified skip list data structure of the present invention may be found in the following exemplary Insert Routine Program Listing C:

PROGRAM LISTING C - INSERT ROUTINE

```
insert(skl, key, value)
{
   p = skl—>header;
   match = 0
   i = 1;
   k = skl—>level;
   do
   {
      nextmatch = match
      while ((next = p—>forward[k]) &&
         (i = cmp(next, key, &nextmatch)) < 0)
      {
         match = nextmatch
         p = next
      }
      update[k] = p
      matched[k] = match
      nextmatched[k] = nextmatch
   } while (i && ++k <= 0)
   if (!i) return failure
   w = calculate_level( )
   if (w < skl—>level)
   {
      m = skl—>level
      while (w < m)
      {
         update[—m] = skl—>header
         matched[m] = 0
      }
      skl—>level = m
   }
   new = new_node(key, matched[w], value)
   for (k = w; k <= 0; k++)
   {
      next = update[k]—>forward[k]
      if (next && next—>compressed < nextmatched[k])
```

-continued

PROGRAM LISTING C - INSERT ROUTINE

```
        next = recompress_node(next, nextmatched[k])
        new—>forward[k] = next
    }
    update[w]—>forward[w] = n32
    k = w
    while (++k <= 0)
    update[k]—>forward[k] = 0
}
```

Figure 5B:
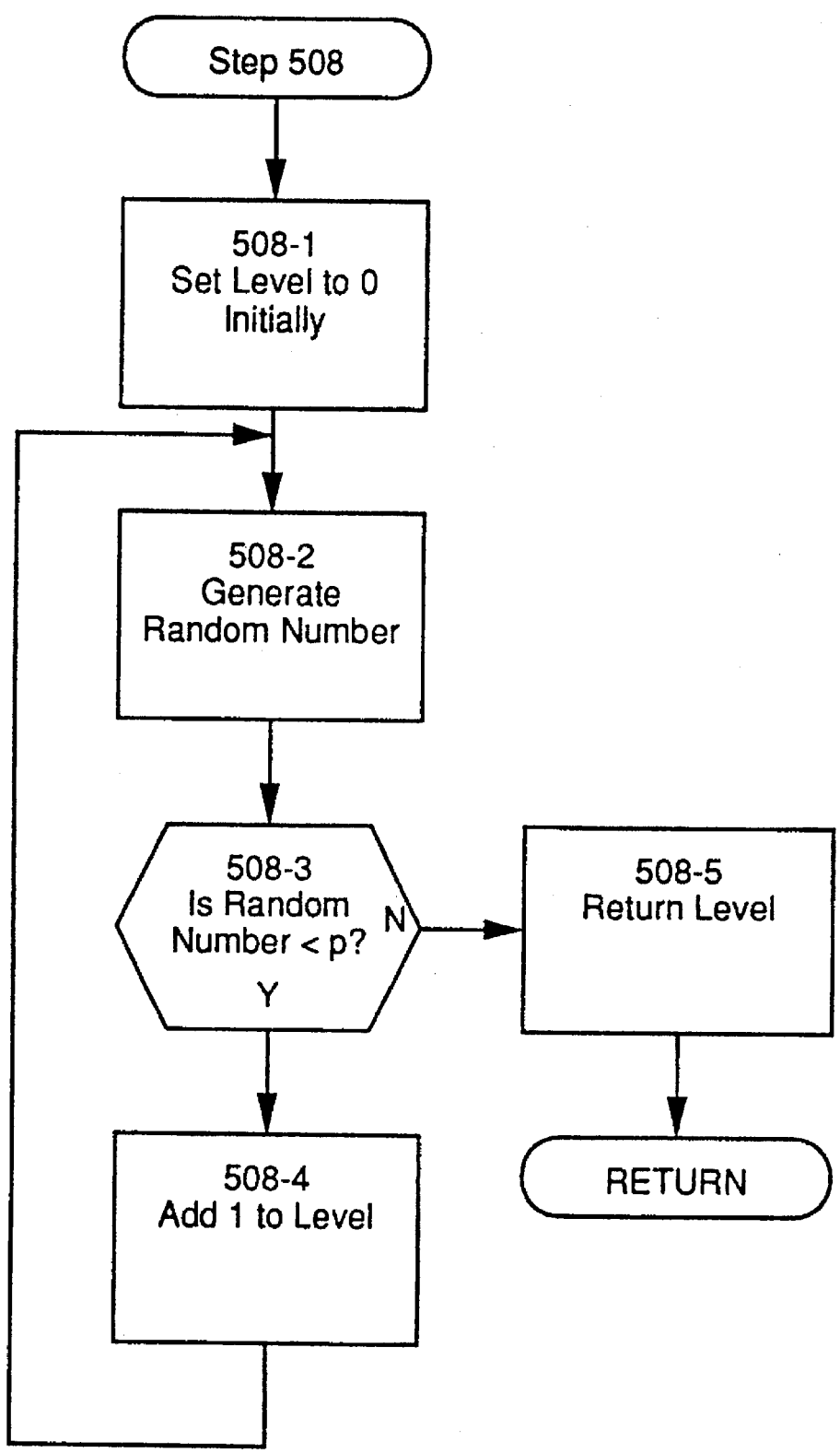

FIG. 5b is a flow diagram of an embodiment of the subprocess of step 508 of FIG. 5a, in which the level of the new node is calculated. The subprocess begins in step 508-1, in which the level of the new node is initially set to 0. In step 508-2, a random number is generated. In step 508-3, the random number is compared to a preselected constant p. If the random number is less than p, the subprocess goes to step 508-4, in which one is added to the level of the new node. The subprocess then goes to step 508-2. If the random number is not less than p, the subprocess goes to step 508-5, in which the resulting level of the new node is returned. The subprocess then returns to the main routine 124.

Further description of the calculation of the level of a new node in a modified skip list data structure of the present invention may be found in the following exemplary Calculate Level Routine Program Listing D:

PROGRAM LISTING D - CALCULATE LEVEL ROUTINE

```
calculate_level(skl)
{
    level = 0;
    while (random() < probability) --level
    if (level < MaxLevel) level = MaxLevel
    return level
}
```

Figure 6:
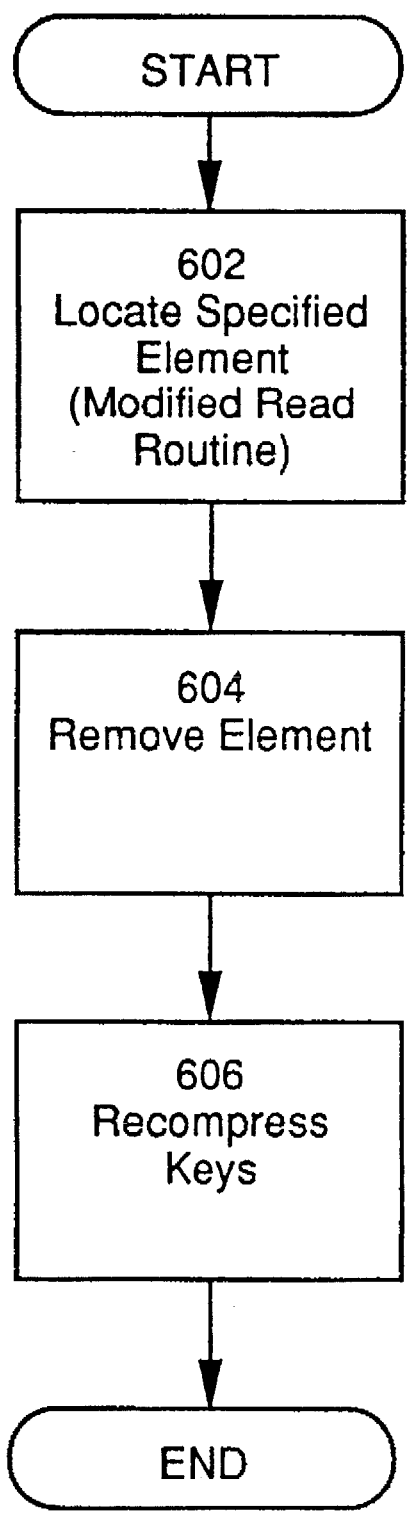
FIG. 6 is a flow diagram of delete routine 126 for use with the database structure of FIG. 2.

FIG. 6 is a flow diagram of delete routine 126. In step 602, routine 126 locates the node having a search key equal to the input search parameter using a process identical to that of read routine 120, except that step 602 returns the location of the node and routine 120 returns the node data. In step 604, routine 126 uses the location of the node returned in step 602 and deletes the node by replacing each pointer which points to the node with the node's pointer of the same level. In step 606, routine 126 recompresses those keys of subsequent nodes which require recompression. Routine 126 then ends.

It is to be understood that the above described arrangement is merely illustrative of the invention and that other arrangements may be devised by those of skill in the art without departing from the spirit and scope of the invention.

What is claimed is:

1. In a database management system including a processor, a disk file, a memory, an I/O adapter and an operator interface, the data structure comprising a root node and a plurality of nodes, each node having at least one pointer which either indicates a subsequent node or indicates that there is no subsequent node, a method of inserting a new node into the data structure, comprising the steps of:

A) locating a position for a new node;
   B) storing an indicator of each node which will be previous to the new node and storing an indicator of a number of matching characters of a key value of each such node;
   C) storing an indicator of a number of matching characters of a key value of each node which will be subsequent to the new node;
   D) selecting a level of the new node;
   E) creating the new node;
   F) updating the pointers of the previous nodes to indicate the new node;
   G) updating the compression of the search keys of the subsequent nodes;
   H) comparing the level of the new node with a maximum level in use; and
   I) updating a root node to the level of the new node, if the level of the new node is greater than the maximum level in use.

2. The method of claim 1, wherein the step of selecting a level of the new node comprises the steps of:

A) selecting a level of zero;
   B) generating a random number;
   C) comparing the random number with a preselected value;
   D) adding one to the selected level; and
   E) repeating step B through D, until the random number is greater than the preselected value.

3. A method of searching a data structure to locate information pertaining to an input search parameter in a database management system including a processor, a disk file, a memory, an I/O adapter and an operator interface, the data structure comprising a root node and a plurality of nodes, each node pointed to by only one previous node and having at least one pointer which either indicates a subsequent node or indicates that there is no subsequent node, the method comprising the steps of:

A) accessing a highest level pointer of a root node;
   B) comparing an input search parameter with a key value of a node indicated by a pointer currently being accessed;
   C) accessing a current level pointer of the node indicated by the pointer currently being accessed and repeating steps B and C, if the input search parameter is greater than the key value;
   D) returning an indicator of the node found, if the input search parameter is equal to the key value;
   E) determining whether the current level is zero, if the input search parameter is less than the key value;
   F) returning an indication that the desired node cannot be found, if the current level is zero; and
   G) moving down one level and repeating steps B through F, if the current level is not zero.

4. The method of claim 3, wherein the step of comparing an input search parameter with a key value comprises the step of:

comparing an input search parameter with a compressed search key which represents a key value, the search key comprising an indicator of a number of initial characters of a key value of a previous node and initial characters of a key value of the node which match and the remaining characters of the key value of the node.

5. The method of claim 4, wherein the step of comparing an input search parameter with a compressed search key comprises the steps of:

A) comparing a recorded indicator of a number of initial characters which match with a portion of a search key which is an indicator of a number of initial characters of a key value of a previous node and initial characters of a key value of the node which match;
   B) recording, for each comparison, the number of initial characters which match;

C) accessing a search key of the node; and

D) generating a key value for the node using the key value for the previous node and the search key of the node.

6. In a database management system including a processor, a disk file, a memory, an I/O adapter and an operator interface, the data structure comprising a root node and a plurality of nodes, each node having at least one pointer which either indicates a subsequent node or indicates that there is no subsequent node, a method of deleting a node from the data structure, comprising the steps of:

A) locating a node to be removed;

B) removing the node; and

C) updating the compression of the search keys of the nodes which were subsequent to the removed node.

7. A database management system comprising:

A) a processor;

B) a memory coupled to and accessible by the processor; and

C) a data structure contained in the memory and accessible by the processor, comprising i) a plurality of nodes, each node comprising a) a search key which identifies the node, the search key representing a key value, b) at least one pointer, the number of pointers selected when the node is created, i) each pointer containing either a) an indicator of the subsequent node, or b) an indicator that there is no subsequent node, ii) each pointer of a particular level which indicates a subsequent node indicating a node of the same level as the pointer, c) the nodes arranged so that they are in sorted order by key value, and d) each node pointed to by only one previous node.

8. The system of claim 7, wherein the search key comprises:

A) an indicator of a number of initial characters of a key value of a previous node and initial characters of a key value of the node which match; and B) the remaining characters of the key value of the node.

9. The system of claim 8, wherein each node further comprises:

a data field which contains the data stored in the node.

10. The system of claim 9, wherein:

the number of pointers of each node is selected at random when the node is created.

11. The system of claim 10, further comprising:

A) an initial node including a plurality of pointers, i) each pointer containing either a) an indicator of the subsequent node, or b) an indicator that there is no subsequent node, ii) each pointer of a particular level which indicates a subsequent node indicating a node of the same level as the pointer.

12. In a data processing system including a processor, a disk file, a memory, an I/O adapter and an operator interface, a system for and quick indexed retrieval of nodes stored in the memory in at least one skip list wherein each of said nodes aside from a root node is pointed to by only one other node, comprising:

A) means, coupled to a processor, for accessing a highest level pointer of a root node;

B) means, coupled to the accessing means, for comparing an input search parameter with a key value of a node pointed to by a pointer currently being accessed;

C) means, coupled to the comparing means, for accessing a current level pointer of the node pointed to by the pointer currently being accessed, if the input search parameter is greater than the key value;

D) means, coupled to the comparing means, for returning an indicator of the node found, if the input search parameter is equal to the key value;

E) means, coupled to the comparing means, for determining whether the current level is zero, if the input search parameter is less than the key value;

F) means, coupled to the determining means, for returning an indication that the desired node cannot be found, if the current level is zero; and G) means, coupled to the determining means, for moving down one level, if the current level is not zero.

13. The system of claim 12, wherein the means comparing an input search parameter with a key value comprises:

means, coupled to the accessing means, for comparing an input search parameter with a compressed search key which represents a key value, the search key comprising an indicator of a number of initial characters of a key value of a previous node and initial characters of a key value of the node which match and the remaining characters of the key value of the node.

14. In a data processing system including a processor, a disk file, a memory, an I/O adapter and an operator interface, a system for allowing key compression and quick indexed retrieval of nodes stored in the memory, comprising:

A) means, coupled to a memory, for locating a position in memory for a new node;

B) a first storage means, coupled to the memory and the locating means, for storing an indicator of each node which will be previous to the new node and storing an indicator of a number of matching characters of a key value of each such node;

C) a second storage means, coupled to the memory and the locating means, for storing an indicator of a number of matching characters of a key value of each node which will be subsequent to the new node;

D) means, coupled to the memory, for selecting a level of the new node;

E) means, coupled to the memory, the level selecting means and the locating means, for creating the new node;

F) means, coupled to the memory and the first storage means, for updating the pointers of the previous nodes to point to the new node;

G) means, coupled to the memory and the second storage means, for updating the compression of the search keys of the subsequent nodes;

H) means, coupled to the memory, for comparing the level of the new node with a maximum level in use; and I) means, coupled to the memory, for updating a root node to the level of the new node, if the level of the new node is greater than the maximum level in use.

15. The system of claim 14, wherein the means for selecting a level of the new node comprises:

A) means, coupled to the memory, for selecting a level of zero;

B) means, coupled to the selecting means, for storing the level;

C) means, coupled to the level storing means, for i) generating a random number;

ii) comparing the random number with a preselected value;

iii) adding one to the selected level;

iv) repeating steps i through iii until the random number is greater than the preselected level.

16. In a data processing system including a processor, a disk file, a memory, an I/O adapter and an operator interface, a system for allowing key compression and quick indexed retrieval of nodes stored in the memory, comprising:

A) means, coupled to a memory, for locating a node to be removed;

B) means, coupled to the memory and the locating means, for removing the node; and C) means, coupled to the memory, for updating the compression of the search keys of the nodes which were subsequent to the removed node.

* * * * *